Dec. 25, 1956     J. R. CUSHMAN     2,775,687
PANEL LIGHTING

Filed Jan. 30, 1953     2 Sheets-Sheet 1

INVENTOR.
JOHN R. CUSHMAN
BY *Dewey J. Cunningham*
ATTORNEY

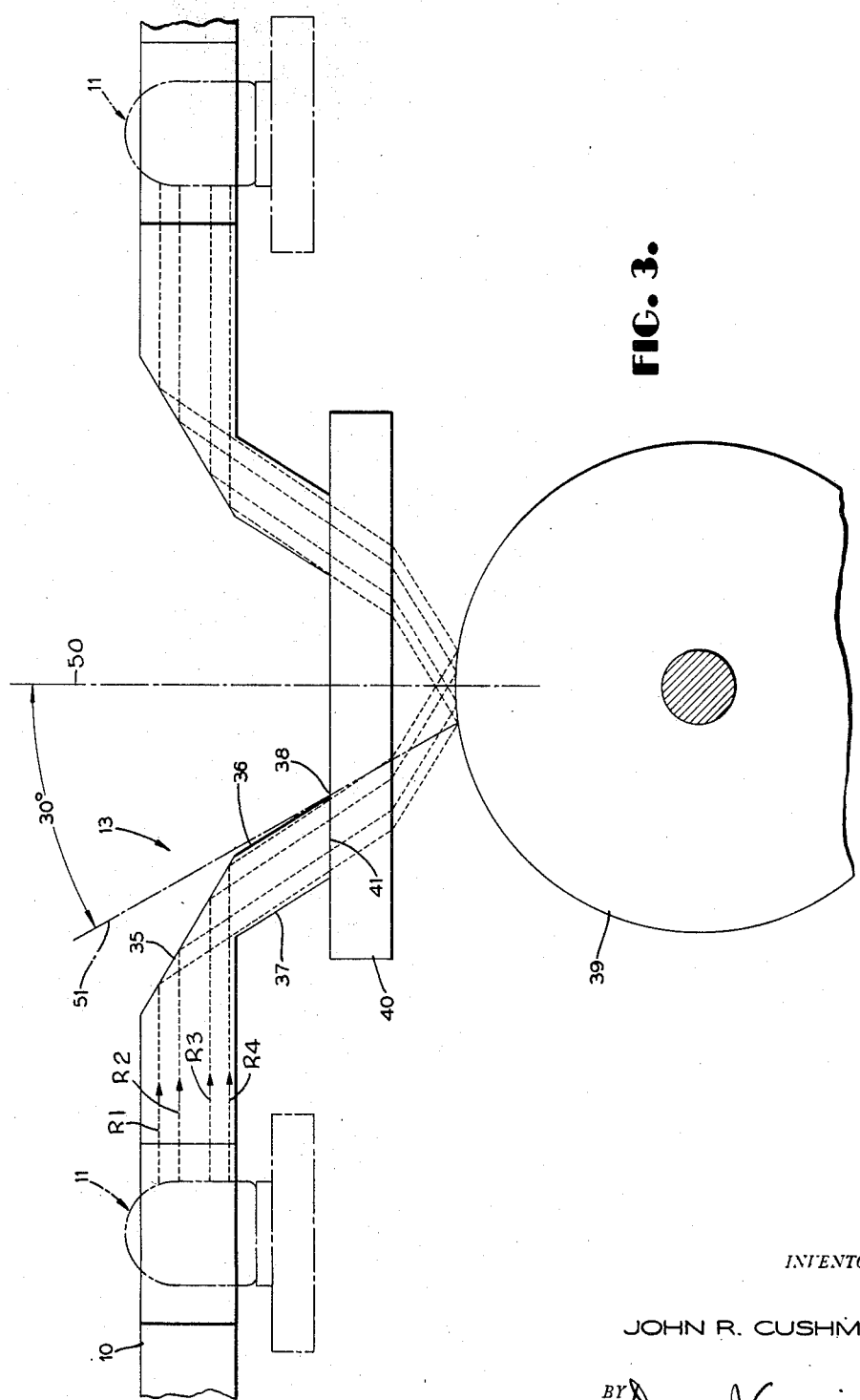

United States Patent Office 2,775,687
Patented Dec. 25, 1956

2,775,687

PANEL LIGHTING

John R. Cushman, Endicott, N. Y., assignor to International Business Machines Corporation, New York, N. Y., a corporation of New York Application January 30, 1953, Serial No. 334,111

1 Claim. (Cl. 240—2.1)

The present invention relates to a panel lighting arrangement wherein the panel is constructed of a light transmitting material and includes a window for directing rays of light from a source located in said panel to an information displaying device adjacent said window, said window having an aperture therein through which the information displaying device may be viewed.

A primary object of the invention is to provide improved means for illuminating an information displaying device.

In present lighting arrangements for illuminating information displaying devices, such as Veeder-Root counters and the like, much difficulty is encountered in obtaining an even distribution of light on the entire area of the counter containing the information. The usual approach is to construct an instrument panel of some type of a light transmitting plastic, said panels having light sources located in apertures therein for supplying light through the plastic material to a window therein. The window includes an aperture having a surrounding edge in the form of reflecting surfaces for directing light rearwardly of the front of the panel. A counter is placed behind the panel so as to be viewable through the window aperture, the light being directed from said window so as to illuminate the information desired on the counter. The counter has a glass cover which is displaced from the window a sufficient distance to permit the light rays to be refracted therefrom and transmitted through the space therebetween. The rays are then refracted at the glass surface and transmitted through the glass to the rear surface thereof from which surface the rays are refracted and transmitted through the air between the glass and the counter to the counter. The refraction in air is necessary to bring the light rays on the counter. That is, since the counter is centered in the window aperture, it is necessary to direct the rays at an angle from the window to the counter in order to illuminate the information thereon. The refraction of the rays from the window to the glass causes the rays to strike the glass in such a position as to be in clear view through the window aperture. These rays are not only refracted on through the glass but are also reflected from the surface of the glass, setting up such a glare thereon as to overshadow the light reaching the counter. This is very undesirable to a person viewing the information since it not only makes the information difficult to read but has a tiring effect on the person's eyes. If the instrument panel is mounted in an aircraft, for example, the tiring effect causes fatigue on the part of the aircraft crew whose job it is to read the information. This, of course, lowers the efficiency of the person at a time when it is most important to maintain maximum efficiency.

Attempts have been made to eliminate this glare or reflection from the glass by coating the surface thereof with a suitable substance but it was not possible to eliminate the detrimental effects to a sufficient degree. Other ways have been attempted such as providing a projection on the front of the panel extending out over the area of the glass causing the reflection. However, this attempt created a corona or halo effect around the periphery of the window aperture which was also undesirable. Another difficulty with the last-mentioned method is a usual design limitation that the information must be made viewable from angles as much as thirty degrees from a direct view perpendicular to the panel.

Another object of this invention is to furnish improved window means in an instrument panel for evenly illuminating an information displaying device mounted adjacent said window means, said information displaying device being viewable through an aperture in said window.

Still another object of the instant invention is to provide improved window means as aforementioned which eliminates halo or corona effects around the aperture periphery.

A further object of the invention is to furnish improved window means which is constructed to direct light from a light source in such a manner that the light is not reflected from the surface of a glass cover placed over the information displaying device.

Still further, an object of the invention is to provide improved means for illuminating an information displaying device with increased intensity over prior art devices.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 3 is a schematic sectional view of the panel window and counter showing light ray tracings in dotted line between the light source and the counter.

Similar reference characters represent the same parts throughout the several views.

Figure 1:
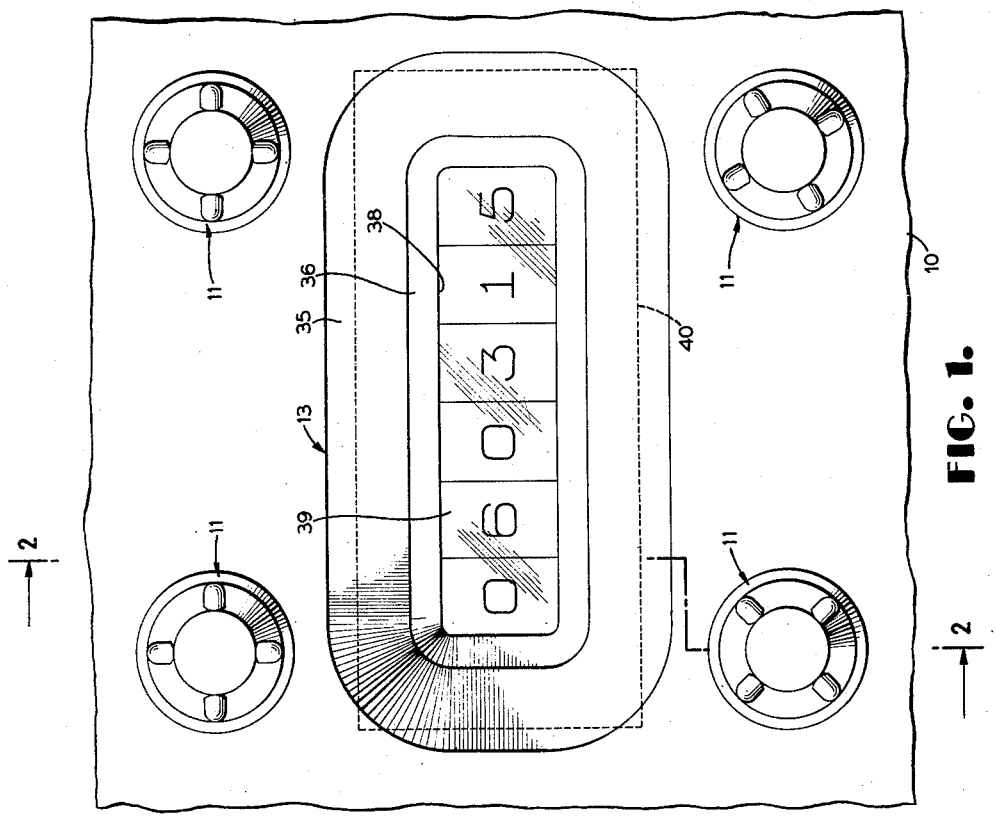
Fig. 1 is a plan view of the instrument panel window showing a counter positioned in the aperture thereof.
Figure 2:
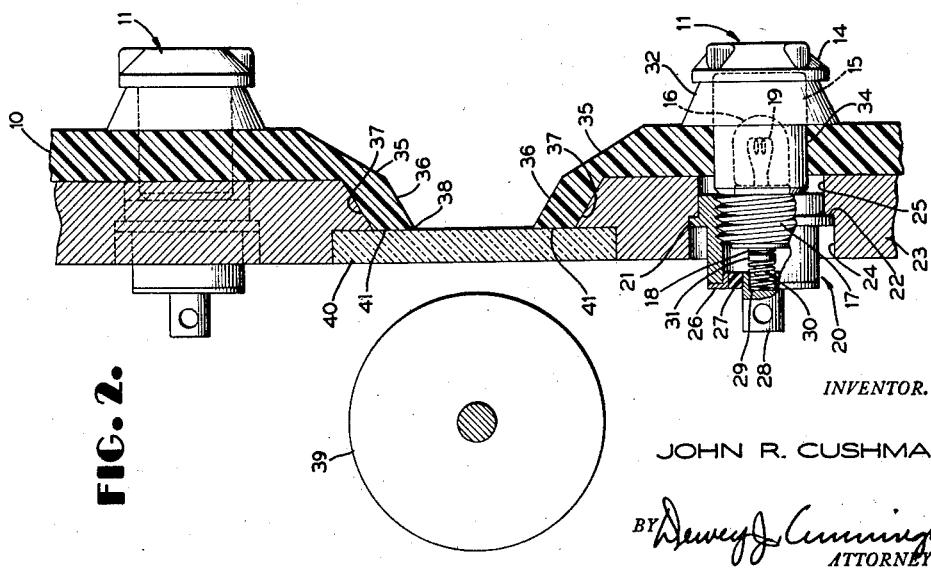
Fig. 2 is a sectional view taken on line 2—2 of Fig. 1.

Referring now to Figs. 1 and 2 in the drawings, the reference character 10 represents the instrument panel which may be of a plastic such as polymerized methyl methacrylate, commonly known by the trade name of Lucite. A plurality of edge-illuminating light sources 11 are mounted in apertures 34 in said panel, said light sources being arranged to provide equal distribution of their light to the panel window illustrated generally by the reference numeral 13.

Light sources 11, as shown in detail in Fig. 2, include a cap 14 secured to one end of a glass sleeve 15 which encloses a bulb 16. The other end of sleeve 15 is secured to one end of a threaded base member 17. An electrode 18 is arranged centrally of the other end of said base member, said electrode being secured to one end of the filament 19 in bulb 16 in the usual manner, the other end of said filament being grounded to base member 17. An internally threaded socket member 20 is adapted to receive base member 17, said socket being furnished with a peripheral flange 21 which is adapted to bear against shoulder 22 in support member 23. The aforementioned shoulder is formed by the difference in radius between concentric apertures 24 and 25. The lower end of socket 20 has a ring 26 secured thereto, said ring having an insulating member 27 moulded therein. A metallic connecting member 28 is embedded centrally of said insulating member and includes a well 29 therein which is adapted to receive one end of a coil spring 30 which is constructed of a material that will conduct electricity. A contact 31 is secured to the other end of said spring. A rubber washer 32, having an exterior frusto-conical shape and an aperture centrally arranged therein, is utilized between cap 14 and instrument panel 10, the assembly being made by inserting the threaded base end of sleeve 15 through the washer aperture and moving the washer into place adjacent cap 14.

To assemble the light source in the instrument panel sleeve 15 is inserted base first through aperture 34 in said panel. Socket 20 is then inserted into apertures 24 and 25, said socket receiving base 17 in threading engagement. Socket 20 is rotated until rubber washer 31 is brought into firm contact with the face of the instrument panel, at which time electrode 18 is in engagement with contact 31, said contact being resiliently biased against said electrode by spring 30. A source of D. C. power supply may be secured to connecting member 28, the current being supplied through spring 30, contact 31 and electrode 18 to one end of filament 19, the other end of said filament being grounded to base member 17.

The light source aforementioned has a heterogeneous or non-directional characteristic. The rays of said source are transmitted through the panel to reflecting surfaces 35 and 36 of window 13. A reflecting surface 37 is provided in spaced relation from surface 36. It will be understood that since the light source is heterogeneous in nature light rays are reflected off both the front and back surfaces of said panel, eventually striking one or more of said surfaces 35, 36 and 37. The back peripheral edge of surface 36 forms an aperture 38 through which the information displaying device, which in the instant case is a counter 39, may be viewed. A glass counter cover 40 is adapted to fit within a bezel formed in support member 23, thus providing a plastic-to-glass surface 41 between the back edges of reflecting surfaces 36 and 37, said surface 41 surrounding aperture 38.

Fig. 3 is a ray tracing showing the path followed by some of the light rays from the light source to the counter. While the light source is heterogeneous the maximum intensity is generally directional. The ray tracings are identical for both sides of the window so that only the tracing for one side will be described.

Rays $R_1$, $R_2$, $R_3$ and $R_4$ are emitted from light source 11 and directed toward reflecting surface 35. The rays are reflected from surface 35 and channeled through the plastic material between reflecting surfaces 36 and 37 to the plastic-to-glass surface 41. Since the plastic and glass have substantially the same index of refraction the rays have no apparent change in direction through glass cover 40. By reason of the intimate contact between the glass and plastic no refraction takes place therebetween. As the rays leave the back of the glass cover they are refracted from the glass surface and transmitted through the air between the glass and counter to provide complete coverage of the counter numerals. That is, ray $R_1$ strikes one side of the numeral while ray $R_4$ strikes the opposite side thereof, rays $R_2$ and $R_3$ striking the surface of the numeral between rays $R_1$ and $R_4$. It will be seen that the rays from the other light source also cover the entire area of the counter on which information is displayed.

A small amount of the light energy may be reflected from the back surface of the glass cover 40 but most of the energy of the rays is refracted. To cut down the reflection to a minimum the back surface of the cover may be coated with a material having an index of refraction which is substantially equal to the square root of the index of refraction of the glass and is of a thickness which is a multiple of one-quarter wave-length of the light being transmitted. One of the materials which closely approximates the required index of refraction is magnesium fluoride.

While only four rays of light have been shown it will be seen that other directional and non-directional rays will eventually reach counter 39 by reflection from the surfaces of the panel and window.

The area of the window between reflecting surfaces 36 and 37 primarily serves as a channeling means for the light from reflecting surface 35. By providing contact between the glass cover 40 and the exit surface of said area any reflection from the glass surface is reflected back into the window to surfaces 35, 36 or 37 where it is diffused. This contrasts greatly with prior art devices which reflected the light from the front glass surfaces outwardly through the window aperture to set up glare or halo effects. Surface 35 is designed to be at such an angle to the maximum intensity light rays that the rays are spread over the entire area of the counter containing the information to be displayed.

As aforementioned, it is often a design requirement that the entire information area on the counter be made visible from an angle at least thirty degrees from a head-on view of the counter. The present window meets this requirement as shown in Fig. 3. A dot-dash line 50 extends through the center of the counter perpendicular to the instrument panel. A dot-dash line 51 extends from the back edge of reflecting surface 36 at aperture 38 to the point where ray $R_1$ strikes counter 39. The acute angle between lines 50 and 51 is thirty degrees which means that the requirement has been met. Should the design requirements change so that an angle greater or less than thirty degrees is required, it is but necessary to change the angles of reflecting surfaces 35, 36 and 37, the most critical surface being surface 35. The channeling means, by virtue of this 30° requirement mentioned above preferably slopes away from the front and rear faces of the panel at approximately 150°. This means that the angle described between the rear face of the panel and reflecting surface 37 is approximately 150°. It can be seen that this angle is approximately equal to the difference between 180° and the viewing angle mentioned above.

From the foregoing it will be seen that the present invention provides a panel window which utilizes the available light in a manner to provide an even illumination of the information on the information displaying device. Because the window provides even illumination of the information it is possible to obtain increased intensity of illumination. That is, the main portion of the usable light rays are not concentrated in a small area. The design of the window is such that reflection from the portion of the glass cover which is in contact with the channeling means exit surface is directed back into the channeling means to be diffused, thus eliminating glare and corona effects from the front of the glass cover.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

A lighting panel having substantially parallel front and rear faces and being constructed of light transmitting material, said panel including a window area positioned therein through which an information displaying device may be viewed, a plurality of light sources mounted within said panel and distributed uniformly around said window area, said sources providing light rays for illuminating said device, said rays traveling from said sources through said material toward said window area, a first reflecting surface extending from the front of said panel rearwardly at a constant angle greater than 90° with the front face of said panel and terminating at a point in a plane containing the rear face of said panel, said first reflecting surface reflecting said rays rearwardly of the front face of said panel, a channeling means including second and third reflecting surfaces positioned parallel to each other, said second surface extending rearwardly from the rear face of said panel, said third surface extending rearwardly from the termination of said first surface, the angle described between said second surface and the rear face of said panel being approximately 150°, said channeling means directing said rays further rearwardly of the front of said panel, a transparent cover extending over said information displaying device but spaced therefrom, said channeling means terminating on the front surface of said cover, said cover having the same index of refraction as said light transmitting material and having a coating of magnesium fluoride on the back surface thereof, the light rays leaving said channeling means and passing rearwardly through said cover with substantially no change in direction and emerging from the rearward surface of said cover and being refracted therefrom through the intervening atmosphere and falling on said information displaying device to illuminate said device.

References Cited in the file of this patent

UNITED STATES PATENTS

| | | |
|---|---|---|
| 2,150,836 | Lamb | Mar. 14, 1939 |
| 2,507,035 | Maynard | May 9, 1950 |
| 2,537,971 | Dames | Jan. 16, 1951 |
| 2,594,081 | Shlenker | Apr. 22, 1952 |
| 2,606,277 | Triplett | Aug. 5, 1952 |
| 2,640,144 | Levy | May 26, 1953 |
| 2,696,550 | Neugass | Dec. 7, 1954 |

FOREIGN PATENTS

| | | |
|---|---|---|
| 884,319 | France | Aug. 10, 1943 |